No. 856,582.  
PATENTED JUNE 11, 1907.  
F. HARPER.  
VALVE MECHANISM.  
APPLICATION FILED MAR. 23, 1906.

Inventor  
Frank Harper

UNITED STATES PATENT OFFICE.

FRANK HARPER, OF JACKSON, OHIO.

VALVE MECHANISM.

No. 856,582.  Specification of Letters Patent.  Patented June 11, 1907.

Application filed March 23, 1906. Serial No. 307,700.

*To all whom it may concern:*

Be it known that I, FRANK HARPER, a citizen of the United States, residing at Jackson, in the county of Jackson and State of Ohio, have invented certain new and useful Improvements in Valve Mechanisms, of which the following is a specification.

This invention embodies novel valve mechanism particularly designed for use in connection with supply means for gas or similar burners, the essential feature of the invention residing in the peculiar construction of said mechanism together with the parts with which it is arranged to coöperate.

Figure 1:
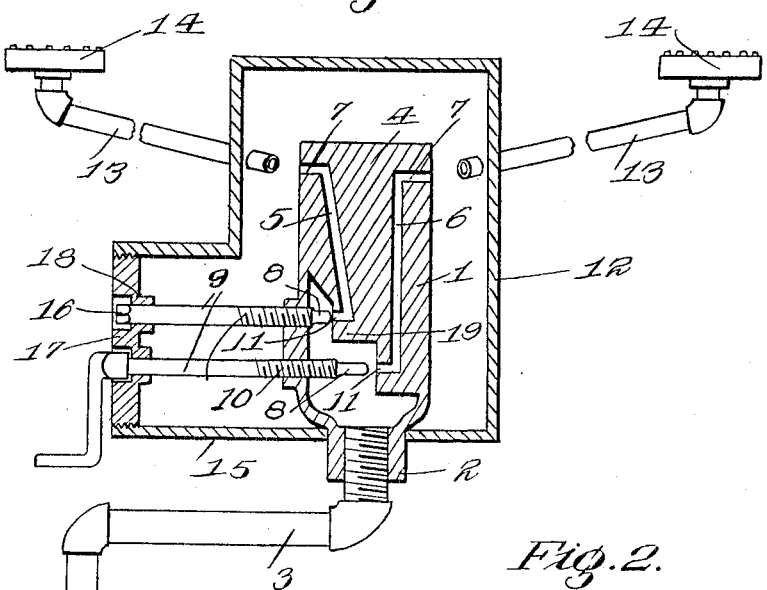
Figure 2:
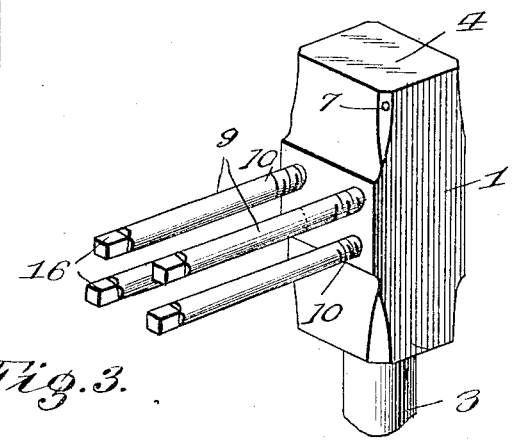
Figure 3:
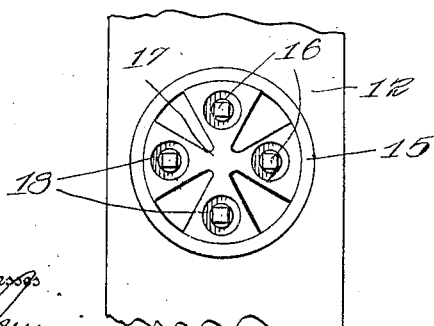

For a full description of the invention and the merits thereof and also to acquire a knowledge of the details of construction of the means for effecting the result, reference is to be had to the following description and accompanying drawings, in which:

Figure 1 is a sectional view showing the valve mechanism applied as when in practical use. Fig. 2 is a detail perspective view of the valve casing alone, showing the arrangement of the operating stems thereon. Fig. 3 is an end view looking into the tubular extension of the mixing chamber.

Corresponding and like parts are referred to in the following description and indicated in all the views of the drawings by the same reference characters.

Specifically describing the invention, the numeral 1 designates the valve casing, the lower extremity of which is reduced as shown at 2 and provided with an integrally threaded opening to admit of ready connection of a supply pipe 3 for gas or similar fuel. The upper portion of the casing 1 is made solid as shown at 4, such portion being provided with a plurality of vertical ducts 5 and 6, respectively. The ducts 5 and 6 have lateral outlets 7 at the upper extremities thereof while the lower ends of the ducts are adapted to be closed by means of valves 8 operable by suitable stems 9. The stems 9 are threaded adjacent to the valves 8, as shown at 10, and the threaded portions are adapted to screw into suitable openings in a side of the casing 1. Lateral seats 11 are provided at the lower ends of the ducts 5 and 6 and the valves 8 are adapted to close against these seats in an obvious manner.

In the preferred application of the invention, the same is used in connection with fuel burners arranged in cooking stoves or similar heaters and in this adaptation the valve casing 1 is inclosed in a mixing chamber 12 arranged within the stove or heater, a number of branch pipes 13 leading off from the mixing chamber 12 and having suitable burners 14 at their outer end portions. The burners 14 are supplied with fuel from the valve regulated ducts 5 and 6, the inner extremities of the pipes 13 terminating at a point a short distance from one of the outlets 7. A lateral tubular extension 15 projects from the lower portion of the mixing chamber 12 and the valve stems 9 are located within this tubular extension. The outer extremities of the stems 9 are squared as shown at 16 to admit of ready application of a key thereto to adjust the valves 8 so as to close or open the ducts 5 and 6 at the lower ends thereof. A spider 17 is secured to the extension 15 at its outer extremity and has its arms provided with suitable openings 18 opposite the squared end portions of the stems 9. The openings 18 center the key as it is caused to engage with a respective one of the stems 9, facilitating quick application of such key in a manner which will be ready apparent.

In the actual use of the invention, one or more of the ducts of the valves 8 may be so adjusted as to regulate the quantity of fuel which passes through the duct or ducts 5 and 6 with which said valves may coöperate. The fuel passing through the ducts 5 and 6 is mixed with air as it exits from the casing 1 through the outlets 7, thence passing to the branch pipes 13 and the burners 14 applied thereto. The solid portion 4 of the casing 1 is formed with stepped recesses 19 having the valve seats 11 thereon, this admitting of the lateral disposition of the valves with respect to the ducts 5 and 6.

Having thus described the invention, what is claimed as new is:

1. In valve mechanism of the type described, the combination of a valve casing having a plurality of vertically arranged fuel ducts, said casing being provided with a fuel inlet opening in its lower end so as to supply said ducts, the lower extremities of the ducts terminating in lateral valve seats, a plurality of valve stems threaded into openings in a side of the casing and provided at their inner ends with valves to close against the sides aforesaid, an air chamber inclosing the valve casing, a plurality of branch fuel pipes leading off from the air chamber and terminating at one end at points adjacent to the outlets of the ducts aforesaid, and burners for said branch fuel pipes.

2. In valve mechanism of the type described, the combination of a valve casing having a plurality of vertically arranged fuel ducts, said casing being provided with a fuel inlet opening in its lower end so as to supply said ducts, the lower extremities of the ducts terminating in lateral valve seats, a plurality of valve stems threaded into openings in a side of the casing and provided at their inner ends with valves to close against the sides aforesaid, an air chamber inclosing the valve casing, a plurality of branch fuel pipes leading off from the air chamber and terminating at one end at points adjacent to the outlets of the ducts aforesaid, burners for said branch fuel pipes, and a lateral tubular extension projecting from the air chamber and inclosing the valve stems.

3. In combination with air chamber, a plurality of branch fuel pipes leading therefrom, burners for said fuel pipes, a lateral tubular extension projecting from the lower portion of the air chamber, valve mechanism in the mixing chamber embodying a valve casing provided with a plurality of vertically arranged ducts having lateral outlets at their upper extremities and terminating in spaced relation to the inner ends of the branch fuel pipes, the lower extremities of the ducts being formed with lateral valve seats, a plurality of valve stems mounted in the tubular extension of the air chamber and threaded into openings in a side of the valve casing, valves at the inner ends of said stems adapted to close against the valve seats aforesaid, and a spider attached to the tubular extension and having the arms thereof provided with openings receiving the outer extremities of the valve stems, the lower extremity of the valve casing being provided with a fuel inlet.

In testimony whereof I affix my signature in presence of two witnesses.

FRANK HARPER. [L. S.]

Witnesses:
R. L. GRIMES,
FRANK DU LAY.